E. A. C. SMITH.

COPPER MATTE CONVERTER.

APPLICATION FILED DEC. 24, 1909.

Reissued Jan. 25, 1910.

13,080.

WITNESSES:

G. H. Barlow

R. B. Penfield

INVENTOR:

E. A. C. Smith,

BY

Fennie & Goldsborough

ATTORNEYS.

UNITED STATES PATENT OFFICE.

ELIAS A. C. SMITH, OF BALTIMORE, MARYLAND.

COPPER-MATTE CONVERTER.

13,080. Specification of Reissued Letters Patent. Reissued Jan. 25, 1910.

Original No. 942,675, dated December 7, 1909, Serial No. 521,532. Application for reissue filed December 24, 1909. Serial No. 534,895.

*To all whom it may concern:*

Be it known that I, ELIAS A. C. SMITH, a citizen of the United States, residing in the city of Baltimore and State of Maryland, have invented certain new and useful Improvements in Copper-Matte Converters; and I do hereby declare the following to be a full, clear, and exact description of the invention, such as will enable others skilled in the art to which it appertains to make and use the same.

In the bessemerizing of copper matte, whether carried on in a converter having an acid lining, or a non-corrodible lining, such as magnesite brick or chrome brick, the operation has heretofore, in so far as I am aware, always been attended with the ejection from the converting vessel of large quantities of the molten matte under treatment. The quantity of matte thus ejected frequently amounts to from twenty-five per cent. (25%) to thirty per cent. (30%) of the entire charge. It is termed in the art "secondaries" and must be remelted in the matte-making furnace in order to be recovered for subsequent use. The additional expense of the fuel required for this remelting, and the inconvenience and annoyance of the ejection of so considerable a quantity of the contents of the converting vessel are disadvantages which my present invention is designed to correct.

Figure 1:
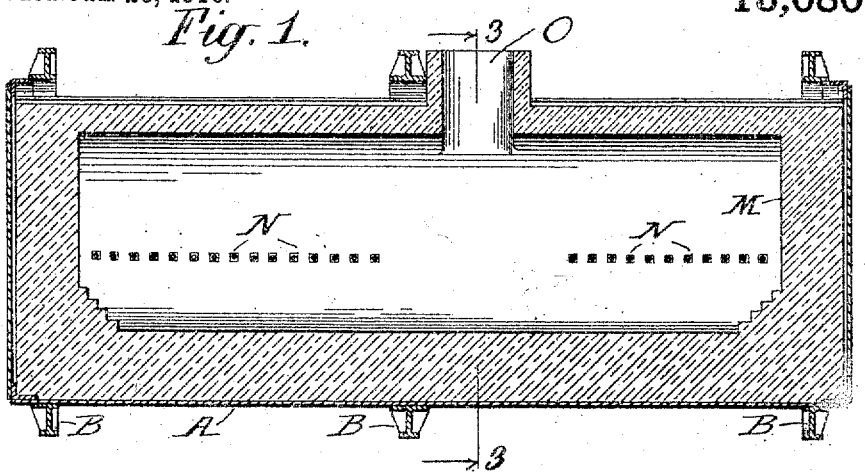
Figure 2:
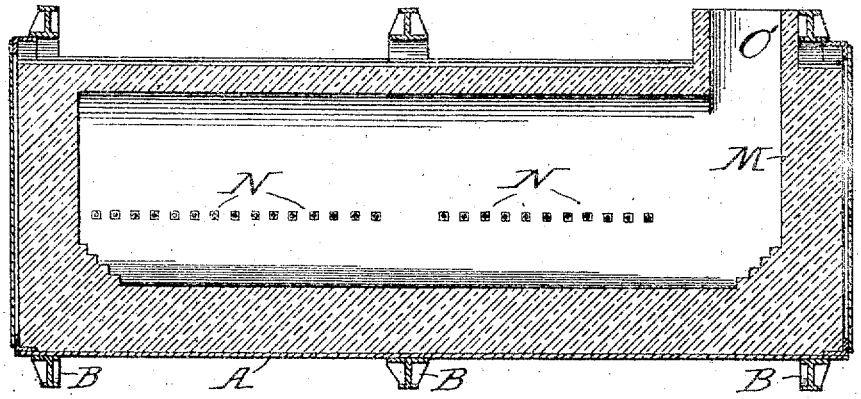
Figure 3:
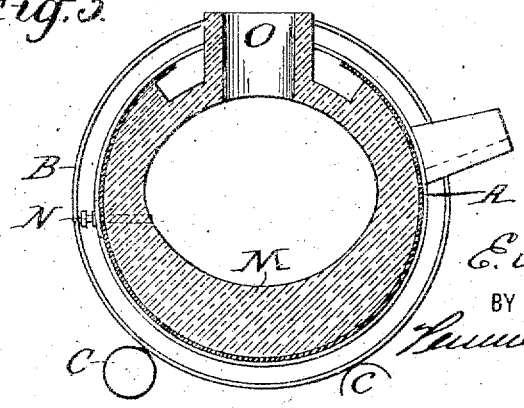

In the accompanying drawings, Figure 1 represents, in longitudinal section, the main elements of a converter, embodying my improvements; Fig. 2 represents a like view of a modification thereof; and Fig. 3 represents a transverse section taken upon the line 3—3 of Fig. 1.

Similar letters of reference indicate similar parts throughout the several views.

Referring to the drawings, A indicates the cylindrical shell of the converter, which is riveted to the rings B, and which is adapted to be oscillated or rocked upon the rollers C.

M indicates the converter lining penetrated by the twyers N.

In the form of the converter shown in Fig. 1, the outlet O for the passage of the gaseous products of the bessemerizing operation is shown as located intermediate of the ends of the converter and at a point about midway thereof, to one side of the central supporting ring. In the form of the converter shown in Fig. 2, the outlet O′ is arranged at the extreme right hand end of the converter. These locations indicate suitable places for locating the outlet, the particular location thereof along the length of the converter being chosen in accordance with convenience. In any event, however, whether the outlet port is located at the extreme end of the converter as shown in Fig. 2, or at some point intermediate of the ends as shown in Fig. 1, the characteristic feature of my invention consists in so arranging the twyers with respect to the outlet port that the outlet port will be substantially out of range of the ejecting or "slopping" action of the twyers. Thus, as shown in Fig. 1, the series of twyers on each side of the outlet port O stops appreciably short of said outlet port; and in like manner, the series of twyers shown in Fig. 2 stops appreciably short of the outlet port O′. In other words, that portion of the converter below the outlet port, in both instances, is devoid of twyers, the outlet port being located substantially beyond the twyers. By this expedient, the matte thrown up by the violent injection of the blast into the charge strikes the roof of the furnace and falls back into the charge, instead of being ejected in large part through the outlet port, and, as a result, in converters having the twyer arrangement described and shown, the loss and annoyance due to the formation of secondaries, incident to the usual operation, is entirely avoided.

What I claim is:

1. A converter for bessemerizing copper matte having a series of twyers for the admission of the bessemerizing blast and having an outlet port for the escape of the gaseous products of the bessemerizing operation, said outlet port being substantially out of range of the slopping action of the twyers; substantially as described.

2. A converter for bessemerizing copper matte, having a series of twyers for the admission of the bessemerizing blast, and having an outlet port for the escape of the gaseous products of the bessemerizing operation, that portion of the converter below the outlet port being devoid of twyers; substantially as described.

3. A converter for bessemerizing copper matte having a series of twyers for the admission of the bessemerizing blast extending longitudinally of the converter, and having an outlet port for the escape of the gaseous products of the bessemerizing operation, said outlet port being located beyond the series of twyers; substantially as described.

In testimony whereof I affix my signature, in presence of two witnesses.

ELIAS A. C. SMITH.

Witnesses:
JOHN C. PENNIE,
LAURA B. PENFIELD.